(12) United States Patent
Wan et al.

(10) Patent No.: US 11,439,908 B2
(45) Date of Patent: Sep. 13, 2022

(54) INFORMATION PROCESSING METHOD AND APPARATUS INCLUDING QUICK BUILD IMPLEMENTED IN AN ATTACK MODE

(71) Applicant: NetEase (Hangzhou) Network Co., Ltd., Zhejiang (CN)

(72) Inventors: Changkun Wan, Zhejiang (CN); Shiliang Li, Zhejiang (CN)

(73) Assignee: NETEASE (HANGZHOU) NETWORK CO., LTD., Zhejiang (CN)

( * ) Notice: Subject to any disclaimer, the term of this patent is extended or adjusted under 35 U.S.C. 154(b) by 36 days.

(21) Appl. No.: 16/480,322

(22) PCT Filed: Jan. 18, 2019

(86) PCT No.: PCT/CN2019/072387
§ 371 (c)(1),
(2) Date: Jul. 24, 2019

(87) PCT Pub. No.: WO2019/149092
PCT Pub. Date: Aug. 8, 2019

(65) Prior Publication Data
US 2021/0354039 A1    Nov. 18, 2021

(30) Foreign Application Priority Data
Feb. 1, 2018    (CN) .......................... 201810103516.7

(51) Int. Cl.
*A63F 13/55*    (2014.01)
*A63F 13/20*    (2014.01)
(Continued)

(52) U.S. Cl.
CPC .............. *A63F 13/55* (2014.09); *A63F 13/20* (2014.09); *A63F 13/40* (2014.09); *A63F 13/537* (2014.09); *A63F 13/60* (2014.09)

(58) Field of Classification Search
None
See application file for complete search history.

(56) References Cited

U.S. PATENT DOCUMENTS

| | | | |
|---|---|---|---|
| 9,104,814 B1 * | 8/2015 | Mompoint | .......... G06F 11/3692 |
| 9,195,376 B1 * | 11/2015 | Wakeford | ............... G06F 3/011 |

(Continued)

FOREIGN PATENT DOCUMENTS

| | | | |
|---|---|---|---|
| CN | 105597312 A | 5/2015 |
| CN | 104965695 A | 10/2015 |

(Continued)

OTHER PUBLICATIONS

Dream Big Publications, Plants vs Zombies Endless Survival Best Setup Strategy, Dream Big Publications, Dec. 17, 2015, http://www.dreamingbigpublications.com/blog/plants-vs-zombies-endless-survival-best-setup-strategy.*

(Continued)

*Primary Examiner* — Jason T Yen
(74) *Attorney, Agent, or Firm* — Gang Yu (57) ABSTRACT

The present disclosure provides an information processing method, including: providing an attack control on a graphical user interface, and in response to a first touch operation acting on the attack control, controlling a first virtual character to execute an attack instruction in a game scene; providing a sub-control of a build control on the graphical user interface, providing the build control on the graphical user interface in response to a second touch operation acting on the sub-control of the build control, and controlling the
(Continued)

first virtual character to execute a build instruction in a first building area of the game scene.

19 Claims, 4 Drawing Sheets

(51) Int. Cl.
  *A63F 13/40* (2014.01)
  *A63F 13/537* (2014.01)
  *A63F 13/60* (2014.01)

(56) References Cited

U.S. PATENT DOCUMENTS

| | | | | |
|---|---|---|---|---|
| 2009/0119597 | A1* | 5/2009 | Vaughan | G06T 13/80 715/732 |
| 2014/0194211 | A1* | 7/2014 | Chimes | A63F 13/95 463/43 |
| 2017/0197144 | A1* | 7/2017 | Maa | G06T 13/80 |
| 2018/0093188 | A1* | 4/2018 | Mabuchi | A63F 13/44 |
| 2018/0193742 | A1* | 7/2018 | O'Connor | A63F 13/358 |

FOREIGN PATENT DOCUMENTS

| | | |
|---|---|---|
| CN | 107583271 A | 1/2018 |
| CN | 107617213 A | 1/2018 |
| CN | 108379837 | 10/2018 |
| WO | 2017054465 A | 4/2017 |
| WO | 2018004061 A | 1/2018 |

OTHER PUBLICATIONS

Jangmo31, Plants vs Zombies Survival Endless Setup, Youtube video, Apr. 27, 2014, https://www.youtube.com/watch?v=rfajjS7DsRM.*

Samen, 8 Cob Cannon Setup Plants vs Zombies Survival Pool Endless, Youtube video, Nov. 13, 2016, https://www.youtube.com/watch?v=kcnQSA8j4E4.*

How the TROVE switches Battle Mode and Construction Mode TROVE Strategy, NeHe, http://newgame.17173.com/content/03282017/145338668.shtml Mar. 28, 2017.

«Fortnite» Multiplayer Escape Game Trial for Free [Eating Chicken? Demolition No. 6? Let you experience the thrill of eating chicken while demolition] http://www.bilibili.com/video/av14877586?from=search & seid=10109922513838037352 Sep. 28, 2017.

[Last Day On Earth] Jul. 4, 2017; https://web.archive.org/web/20170704040946/https://app-field.com/last-day-on-earth-app.

Corresponding JP search report dated Aug. 24, 2020.

Pocket Bus Mobile Game Zone—Plants vs. Zombies—Infinite Survival Mode Eight Guns Flow No. 4 Stage Strategy https://wenku.baidu.com/view/ed125357d15abe23492f4d24 May 21, 2015.

* cited by examiner

INFORMATION PROCESSING METHOD AND APPARATUS INCLUDING QUICK BUILD IMPLEMENTED IN AN ATTACK MODE

TECHNICAL FIELD

The present disclosure relates to the field of game technologies, and in specific to an information processing method and apparatus, a storage medium, and an electronic device.

BACKGROUND

At least one mobile game application running on a mobile terminal currently may have a variety of different themes and game play types, and a combination of a variety of different game play types to improve playability of mobile games is currently a development direction of a game field. For example, a shoot type game and a building type game are combined, or a strategy type game and a parkour type game are combined.

However, for a mobile terminal running the mobile game, it is subjected to hardware conditions such as a smaller terminal display. When multiple interactive controls of different game play types are presented simultaneously on a graphical user interface displayed by a display, the graphical user interface may be complicated due to so many controls, and an accuracy of user's manipulation may be greatly affected. If fewer controls are set on the graphical user interface, it may not be possible to implement effective manipulations on multiple game play types and reduce user experience.

It should be noted that information disclosed in the above background section is used for enhancing understanding of the background of the present disclosure, and therefore may include information not constituting the related art known to those skilled in the art.

SUMMARY

In an embodiment of the present disclosure, an information processing method is provided, including:
providing an attack control on a graphical user interface, and in response to a first touch operation acting on the attack control, controlling a first virtual character to execute an attack instruction in a game scene;
providing a sub-control of a build control on the graphical user interface, in response to a second touch operation acting on the sub-control of the build control, providing the build control on the graphical user interface, and controlling the first virtual character to execute a build instruction in a first building area of the game scene.

In another embodiment of the present disclosure, an information processing apparatus is provided, including:
an attack component configured to provide an attack control on a graphical user interface, and in response to a first touch operation acting on the attack control, controlling a first virtual character to execute an attack instruction in a game scene;
a building component configured to provide a sub-control of a build control on the graphical user interface, in response to a second touch operation acting on the sub-control of the build control, providing the build control on the graphical user interface, and controlling the first virtual character to execute a build instruction in a first building area of the game scene.

In another embodiment of the present disclosure, a computer readable storage medium storing a computer program is provided, and the computer program is executed by a processor to implement the information processing method described above.

In another embodiment of the present disclosure, an electronic device is provided, including:
a processor; and
a memory configured to store executable instructions of the processor;
and the processor is configured to execute the information processing method described above by executing the executable instructions.

DETAILED DESCRIPTION

It should be noted that embodiments and features in the embodiments of the present disclosure may be combined with each other without conflict. Hereinafter, the present disclosure will be described in detail with reference to the accompanying drawings and embodiments.

In order to make those skilled in the art better understand the technical solutions of the present disclosure, the technical solutions in the embodiments of the present disclosure will be clearly and completely described below with reference to the accompanying drawings in the embodiments of the present disclosure. Apparently, the described embodiments are a part of the embodiments of the present disclosure, rather than all of the embodiments. Based on the embodiments of the present disclosure, all other embodiments obtained by those skilled in the art without creative efforts shall fall within the scope of protection of the present disclosure.

It should be noted that the terms "first," "second," and the like in the description and claims of the present disclosure and the figures described above are used to distinguish similar objects, and do not need to be used to describe a specific order or a sequence. It is to be understood that the data so used may be interchanged as appropriate for the embodiments of the disclosure described herein. Moreover, the terms "including" and "having" and any variation thereof, are intended to cover not exclusively including, for example, processes, methods, systems, products or apparatuses including a series of steps or elements are not necessarily limited to those steps or elements that are clearly listed. Instead, other steps or elements not expressly listed or inherent to these processes, methods, products or devices may be included.

It should also be noted that various triggering events disclosed in the present description may be preset, and different triggering events may trigger different functions to be performed.

Figure 1:
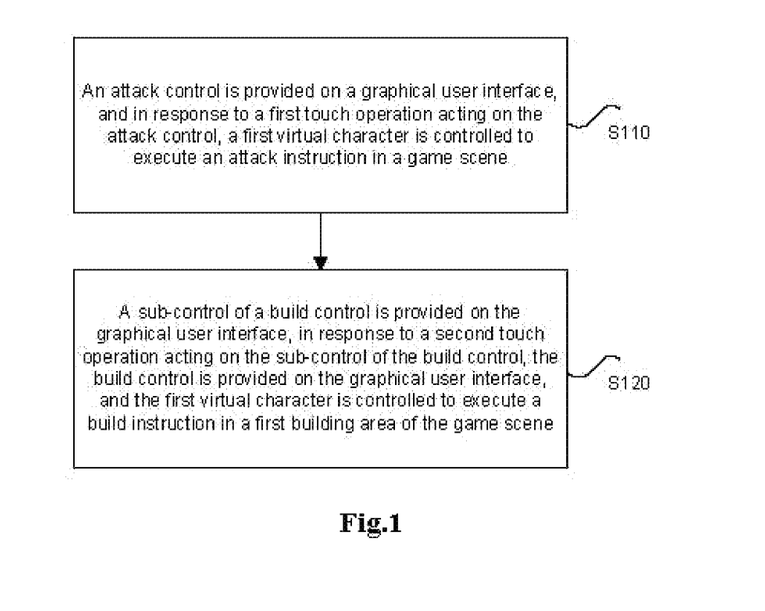
FIG. 1 is a flowchart of an information processing method according to an embodiment of the present disclosure.

In an embodiment of the present disclosure, an information processing method is provided. And an executed object of this method may be any mobile terminal device, such as a mobile phone, a personal digital assistant (PDA), a tablet computer, a handheld game terminal, and an electronic device. FIG. 1 is a flowchart of an information processing method according to an embodiment of the present disclosure. As shown in FIG. 1, the method in this embodiment includes the following steps.

At step S110, an attack control is provided on a graphical user interface, and in response to a first touch operation acting on the attack control, a first virtual character is controlled to execute an attack instruction in a game scene.

At step S120: a sub-control of a build control is provided on the graphical user interface, in response to a second touch operation acting on the sub-control of the build control, the build control is provided on the graphical user interface, and the first virtual character is controlled to execute a build instruction in a first building area of the game scene.

Through the new interactive mode proposed by this embodiment of the present disclosure for implementing a combination of multiple game play types on a mobile terminal, on the one hand, a burden of the number of controls of the graphical user interface is not increased, and on the other hand, quick build can be implemented in an attack mode, smoothness of operations is increased, and game experience is greatly improved.

Hereinafter, steps of the information processing method in the present exemplary embodiment will be further described.

In the present exemplary embodiment, this method is applied to a mobile terminal having at least one processor for executing a software application and a touch screen which is rendered with the graphical user interface, and contents rendered on the graphical user interface include at least one first virtual character.

The contents rendered on the graphical user interface may include the entire game scene or may be part of the game scene. For example, when the game scene is relatively large, a local content of the game scene is displayed on the graphical user interface of the mobile terminal during game. The game scene may be a square shape or another shape (for example, a circle or the like). The game scene may include ground, mountain, stones, flowers, grass, trees, buildings, etc.

The game scene includes at least one first virtual character, which may be rendered on the graphical user interface, and contents rendered on the graphical user interface may include all of each virtual character or may be a part of each virtual character. For example, in a third person perspective game, the contents rendered on the graphical user interface may include all of each virtual character. For another example, in a first person perspective game, the contents rendered on the graphical user interface may include a part of each virtual character. A first virtual character may be a game virtual character that is manipulated by the mobile terminal.

In an alternative embodiment, a mini-map is provided on the graphical user interface. The mini-map may be a thumbnail of the whole game scene, or a thumbnail of a part of the game scene. Different details may be displayed in the mini-map for different types of games. For example, details of the mini-map may be used for assisting a player to determine a location of a virtual character controlled by this player in a game world, real-time location of at least one ally character, real-time location of at least one enemy character, current game scene view information and so on. The mini-map may be provided on the upper left, upper right of the graphical user interface, or other location on the graphical user interface. And the present exemplary embodiment provides no limitations on the location of the mini-map.

At step S110, an attack control is provided on a graphical user interface, and in response to a first touch operation acting on the attack control, a first virtual character is controlled to execute an attack instruction in a game scene.

In an optional implementation, the attack control may be preset and provided at any position of the graphical user interface, or provided at a specific position according to a touch operation of a user, or may be provided at a suitable position automatically selected according to a layout of the current graphical user interface. And the present exemplary embodiment provides no specific limitations on the location of the attack control.

In an optional implementation, the attack control is a visible area. For example, the attack control is a touch control having a boundary box, or a touch control filled with a color, or a touch control having a predetermined transparency, or other control controls capable of visually indicating a range of the attack control. And the virtual character is controlled to attack in the game scene according to at least one touch control operation such as at least one of sliding and clicking acting on the touch control. The visual area enables a user to quickly position the touch control, thereby reducing an operation difficulty of each new game player.

In an optional implementation, the attack control is an invisible area. The invisible area does not cover or affect a game screen, provide a better screen effect, and can save screen space and be applicable to operations of each game master.

In an optional implementation, an operation of controlling the first virtual character to execute the attack instruction in the game scene may refer to control the first virtual character to execute an attack action in the game scene according to the received attack instruction, regardless of whether this attack has a target. This operation may also refer to control the first virtual character to initiate an attack to a second virtual character in the game scene according to the received attack instruction. The second virtual character as a attack object in the game scene may be a game virtual character controlled by another mobile terminal, and the second virtual character and the first virtual character belong to different camps or the same camp. The second virtual character in the game scene may also be an attackable object in the game scene, such as a house, a carrier, a fence, etc., in which a kind of each attackable object may be preset by a developer.

At step S120, a sub-control of a build control is provided on the graphical user interface, in response to a second touch operation acting on the sub-control of the build control, the build control is provided on the graphical user interface, and the first virtual character is controlled to execute a build instruction in a first building area of the game scene.

In an optional implementation, the sub-control of the build control is provided on the graphical user interface. An association relationship exists between the sub-control of the build control and the build control. And the sub-control of the build control may be one of components of the build control, or may be an independent control. The sub-control of the build control is arranged to trigger to provide the build control corresponding to the sub-control on the graphical user interface according to the second touch operation. The sub-control of the build control may be preset at any position of the graphical user interface, or provided at a specific position according to a touch operation of a user, or provided at a suitable position automatically selected according to the layout of the current graphical user interface. And the present exemplary embodiment provides no specific limitations on the location of the sub-control of the build control.

In an optional implementation, in response to the second touch operation acting on the sub-control of the build control, the build control is provided on the graphical user interface, and the first virtual character is controlled to execute the build instruction in the first building area of the game scene. The second touch operation may be a touch operation, or a click operation through a touch medium, or the like. The build control is provided on the graphical user interface. The build control may be hidden in advance on the graphical user interface, and the build control may be triggered to be displayed on the graphical user interface according to the second touch operation. Or the build control corresponding to the sub-control of the build control may be provided, according to the second touch operation, on the graphical user interface. The build instruction is executed in the first building area of the game scene. And the first building area of the game scene may be a preset specific area or a specific area provided after a preset condition is satisfied.

In an optional implementation, the build instruction is executed in the first building area of the game scene. The build instruction may be a preview instruction as follows. A specific model is placed in the first building area, and in response to the build triggering event, a building corresponding to the specific model is built in the first building area. The build triggering event may satisfy a preset condition, such as: exceeding a preset duration, exceeding a preset number of times, etc., may also be detecting a touch operation on a specific control or area.

In an alternative implementation, the build instruction is executed in the first building area in the game scene as follows. A building corresponding to a specific model is directly built in the first building area. That is, a build preview step is not set, and in response to the second touch operation acting on the sub-control of the build control, the building corresponding to a certain preset building model or the building corresponding to the sub-control of the build control is directly built in the first building area.

In an optional implementation, at step S120, the step of providing the build control on the graphical user interface further includes the following step.

At step S1201, the attack control is replaced with the build control on the graphical user interface.

In an optional implementation, the step of replacing the attack control with the build control is to make the attack control have a function of controlling the first virtual character to build the building. Before the attack control is replaced with the build control, the attack control may be provided with at least one control function including or not including the function of controlling the first virtual character to build the building, and after the attack control is replaced with the build control, the attack control is provided with the function, corresponding to the build control, of controlling the first virtual character to build the building. And this function may reuse resource (such as an auxiliary control area, a rocker, an icon, and the like) corresponding to an original attack control with at least one control function. This function may also provide corresponding resource for the user to manipulate. And the present exemplary embodiment provides no specific limitations on the resource.

In an optional implementation, the step of replacing the attack control with the build control is to hide or cancel the attack control on the graphical user interface and provide the build control at a position of the attack control or near the location of the attack control.

Through the above embodiments, on the graphical user interface, the attack control is replaced with the build control, which further reduces an occupancy rate of the graphical user interface, improves a smoothness of operations, and further improves players' game experience.

In an alternative embodiment, the method further includes the following steps.

At step S130, the build control is restored to the attack control on the graphical user interface, and the sub-control of the build control is provided.

After executing the build instruction in the first building area of the game scene, the build control is restored to the attack control on the graphical user interface automatically or in response to a restore triggering event. And the sub-control of the build control is provided. The recovery triggering event may satisfy a preset condition, such as exceeding a preset duration, exceeding a preset number of times, and the like. The recovery triggering event may also be in response to a touch operation acting on a specific control or area. The sub-control of the build control may be provided on an original position of the sub-control of the build control of the graphical user interface, or the sub-control of the build control may be reserved when the build control are restored to the attack control.

In an optional implementation, the step of restoring the build control to the attack control is to make the attack control restore a function of controlling the first virtual character to build to a function of controlling the first virtual character to attack, so that the function of controlling the first virtual character to build is no longer provided. And resource (such as an auxiliary control area, a rocker, an icon, and the like) related with the attack control is restored to the function of controlling the first virtual character to attack.

In an optional implementation, the step of restoring the build control to the attack control is to hide or cancel the build control on the graphical user interface and provide the attack control at a position of the build control or near the location of the build control.

Through the above implementations, after the execution of the build instruction is completed, a build state can be automatically and quickly switched back to an attack state, which reduces operation steps of the user, increases a smoothness of the operations, and improves user experience.

In an optional implementation, at step S120, the step of controlling the first virtual character to execute the build instruction in the first building area of the game scene further includes the following step.

At step S1202, a building model to be built is placed in the first building area of the game scene.

At step S1203, in response to a building confirmation triggering event, the first virtual character is controlled to build a building corresponding to the building model to be built in the first building area.

The building model to be built may be a preset specific model, or a specific model determined according to a user's selection operation.

The building model to be built is placed in a first building area of the game scene. It should be noted that, in this embodiment, an operation of placing the building model to be built in the first building area refers to that the building model to be built is not built in the first building area, but the building model to be built is previewed to display in the first building area. And in an optional embodiment, a corresponding feedback prompt may be sent to the user. For example: a differentiation processing is performed to the building model to be built placed in the first building area, such as blurring display, highlighting display, etc., and a state of the building model to be built is adjusted according to an operation of the user, such as modifying a size and orientation of the building model to be built.

In response to a building confirmation triggering event, a building corresponding to the building model to be built is built in a first building area of the game scene. The building confirmation triggering event may be triggered in response to a touch operation acting on a specific trigger control provided on the graphical user interface, or may be triggered according to a preset interaction condition, such as manners including pressing, shaking, sound input, and special gesture operation of the user.

The building corresponding to the building model to be built is built in the first building area of the game scene. It should be noted that, in response to building confirmation triggering event, that is, the user confirms a position and state of a current model, and at this time, the building model to-be-built previously placed in the first building area is built into a corresponding build.

In an optional implementation, before in response to the building confirmation triggering event, information such as placement position, orientation, angle, material and type of the building model to be built may be adjusted.

Through the above-mentioned embodiments, a preview mode is set before confirming to build the building, so as to increase fault tolerance during building of a user, thereby providing a more smooth maneuverability for the user, and effectively improving the user experience.

In an optional implementation, the build control includes: at least two building model selection controls. The sub-control of the build control is a building model selection control of the at least two building model selection controls.

The at least two building model selection controls respectively correspond to different building models, such as a horizontal plate, a vertical wall, an upward ladder, a downward slope, etc. The building model selection control is used for determining the building model to be built in response to a touch operation of the user. The sub-control of the build control is one of at least two building model selection controls. For example, the sub-control of the build control is a building model selection control corresponding to the upward ladder.

It should be noted that, when the sub-control of the build control is one of the building model selection controls, the building model selection control is determined as the sub-control of the build control to be displayed on the graphical user interface may be set in advance by the game developer, or the building model selection control is determined, according to the user's selection, as the sub-control of the build control to be displayed on the graphical user interface may be set in advance by the game developer.

In an optional implementation, at step S1202, the step of placing the building model to be built in the first building area of the game scene further includes the following steps.

At step S12021, a building model corresponding to the sub-control of the build control is determined as the building model to be built.

At step S12022, the building model to be built is placed in the first building area of the game scene.

The building model corresponding to the sub-control of the build control where a touch point corresponding to the second touch operation is located is the building model to be built, and the building model to be built is placed in the first building area of the game scene.

In an optional implementation, the step of providing the build control on the graphical user interface includes the following step. All building model selection controls are provided on the graphical user interface.

In an optional implementation, the sub-control of the build control is a part of the build control. The build control is in a hidden state on the graphical user interface or the build control is cancelled when the first virtual character is in an attack state. And the sub-control of the build control resides on the graphical user interface. In response to the second touch operation acting on the sub-control of the build control, on the one hand, a build operation is triggered in the first building area of the game scene, and on the other hand, all sub-controls contained in the build control are triggered to be provided on the graphical user interface, or the build control in the hidden state is modified to the display state.

In an optional implementation, at step S12021, after the building model corresponding to the sub-control of the build control is determined as the building model to be built, the method further includes the following steps.

At step S12021_1: in response to a third touch operation acting on one of the at least two building model selection controls other than the sub-control of the build control, the building model to be built is modified according to the third touch operation.

After the building model corresponding to the sub-control of the build control is determined as the building model to be built, in response to the third touch operation acting on one of the at least two building model selection controls other than the sub-control of the build control, the selected building model selection control is determined according to the third touch operation, the building model corresponding to the selected building model selection control is determined as the current model to be built, and the building model originally placed in the first building area is replaced with the current model to be built.

In an optional implementation, the build control further includes a confirmation build control.

In an optional implementation, at step S1203, in response to a building confirmation triggering event, the step of the first virtual character is controlled to build the building corresponding to the building model to be built in the first building area includes the following steps.

At step S12031, in response to a confirmation operation acting on the confirmation build control, the building corresponding to the building model to be built is built in the first building area of the game scene.

In an optional implementation, the confirmation build control may be preset to provide at any position on the graphical user interface, or may be provided at a specific position according to a touch operation of the user, or may be automatically selected to provide an appropriate position according to the layout of the current graphical user interface. And the present exemplary embodiment provides no specific limitations on the position of the confirmation build control.

In response to the confirmation operation acting on the confirmation build control, the building corresponding to the building model to be built is built in the first building area of the game scene. It can be understood that the confirmation operation may be various touch operations such as click, slide, and repress, and may be an independent touch operation or a combined touch operation composed of multiple touch operations in sequence.

The building corresponding to the building model to be built is built in the first building area of the game scene. It should be noted that, in response to a second touch confirmation operation, that is, the user confirms the position and state of the current model, and at this time, the building model to be built, which is placed in the first building area, is built into a corresponding building.

Through the above implementations, the preview mode is set before confirming to build the building, fault tolerance of the user during building is increased, and at the same time, a reasonable control is set to provide the user with more smooth operability, and the user experience is effectively improved.

Figure 2:
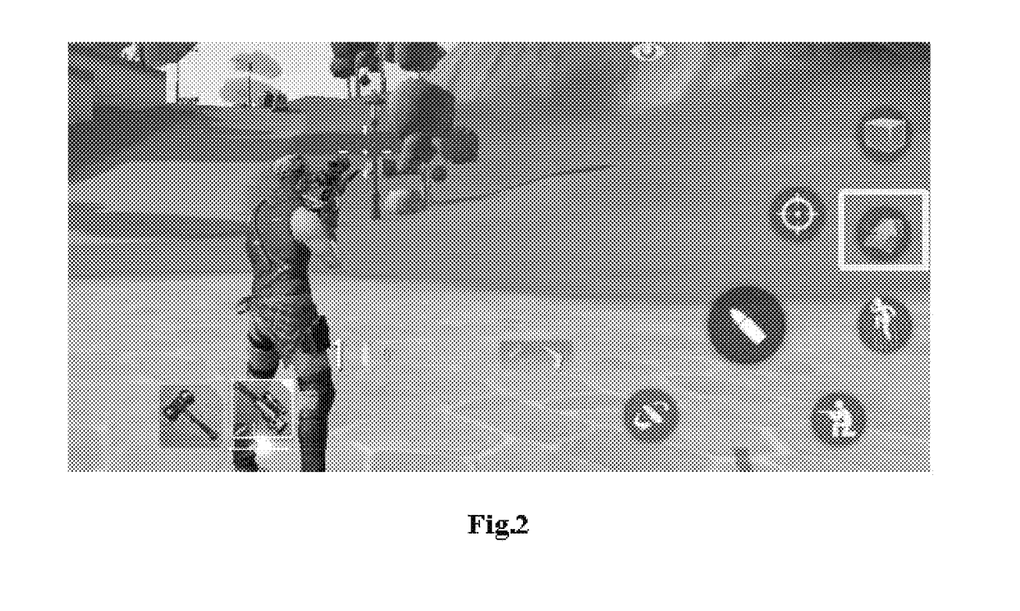
FIG. 2 is a schematic diagram of a graphical user interface according to an exemplary embodiment of the present disclosure.

In an alternative embodiment, FIG. 2 is a schematic diagram of a graphical user interface in an exemplary embodiment of the present disclosure. As shown in FIG. 2, a character in the game scene is the first virtual character, and at this time, the first virtual character holds a gun and may initiate an attack in the game scene. As shown in FIG. 2, the lower right corner on the graphical user interface is an attack control (namely bullet icon), and the user controls the first virtual character to attack by performing at least one touch operation on the attack control. Meanwhile, the right side on the graphical user interface provides a sub-control of a build control (namely an upward ladder icon in a block). The sub-control of the build control is one of multiple building model selection controls contained in the build control. When the user clicks the sub-control, on the one hand, a building model of an upward ladder (namely a building model corresponding to the sub-control of the build control) is placed in front of the first virtual character (namely a first building area of the game scene), and the upward ladder model is in a build preview state, that is, the upward ladder model is distinguishably displayed (namely blurring displayed) in the first building area; on the other hand, the build control is provided on the graphical user interface, and the build control includes all building model selection controls (namely icons within the block) and at least one confirmation control (namely an icon of downward arrow).

Figure 3:
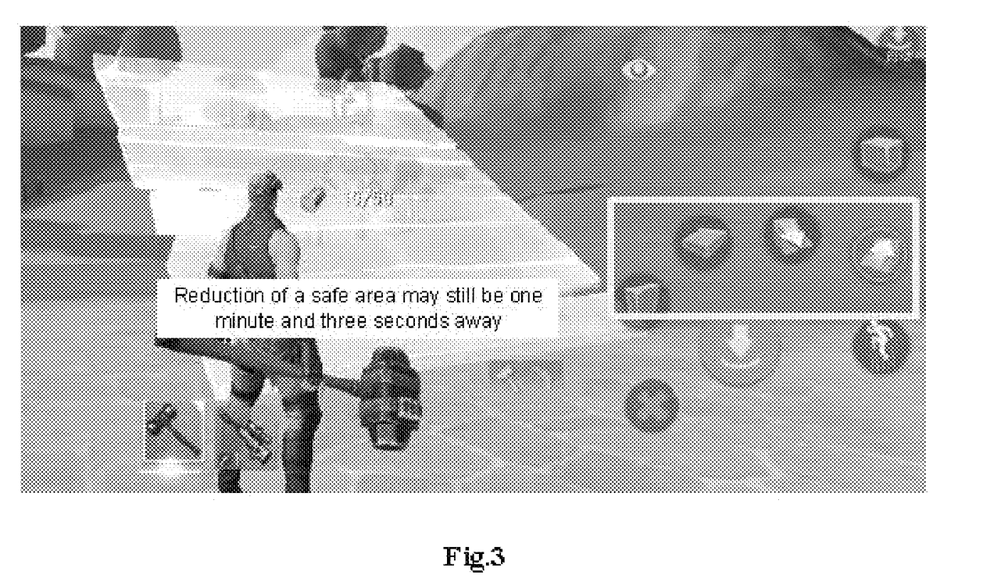
FIG. 3 is a schematic diagram of a graphical user interface according to another exemplary embodiment of the present disclosure.

FIG. 3 is a schematic diagram of a graphical user interface in another exemplary embodiment of the present disclosure. As shown in FIG. 3, on the graphical user interface, the attack control is replaced with a build control (namely a pick head icon and a building model icon), and the user controls the first virtual character to build the building in the game scene by manipulating the built control. For example, when the user clicks a vertical wall model selection control, a vertical wall is determined as the current model to be built, and the building model of the upward ladder placed in front of the first virtual character is replaced with the building model of the vertical wall. Before the user touches the confirmation control, the vertical wall model is in a build preview state, that is, the vertical wall model is distinguishably displayed (namely blurring displayed) in the first building area, and when the user clicks the upward ladder model selection control again, the upward ladder is determined as the current model to be built again. The building model of the vertical wall placed in front of the first virtual character is replaced again with the building model of the upward ladder.

Figure 4:
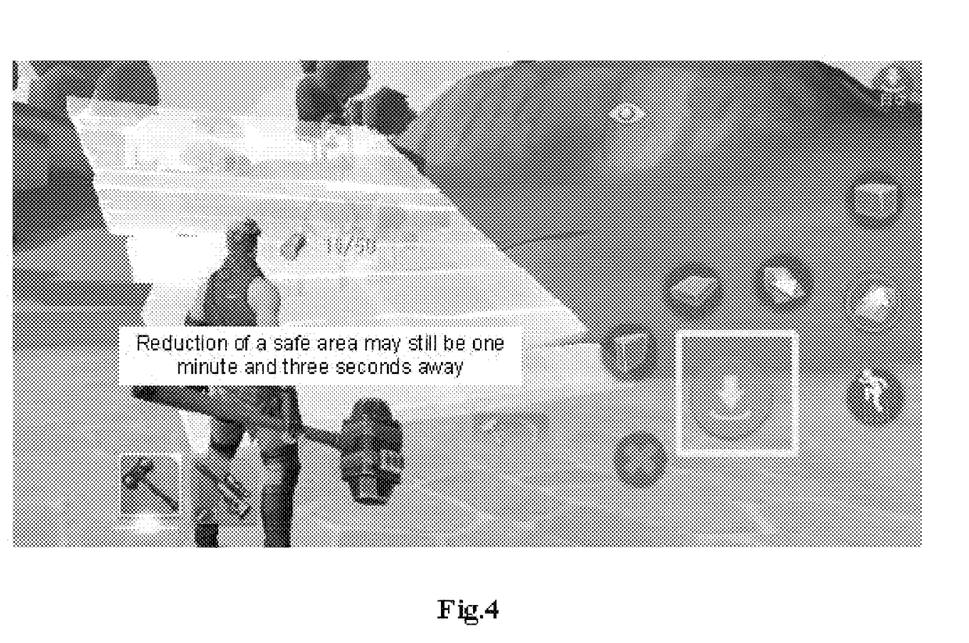
FIG. 4 is a schematic diagram of a graphical user interface according to another exemplary embodiment of the present disclosure.

FIG. 4 is a schematic diagram of a graphical user interface according to another exemplary embodiment of the present disclosure. As shown in FIG. 4, when a user clicks a confirmation build control (namely downwardly arrow icon), the building model of the upwardly ladder is built as the upwardly ladder (embodied) in the first building area.

Through the new interactive mode proposed in the present exemplary embodiment for implementing a combination of multiple game play types on a mobile terminal, on the one hand, the number of controls of the graphical user interface is not increased, on the other hand, quick build can be implemented in an attack mode, the smoothness of operation is increased, and the game experience is greatly improved.

In an optional implementation, at step S120, the step of controlling the first virtual character to execute the build instruction in the first building area of the game scene further includes the following step.

At step S1204, the first building area is determined according to the current position and the current orientation of the first virtual character in the game scene, and the build instruction is executed in the first building area.

In the game scene, the first virtual character may change a movement direction according to an operation instruction received by the mobile terminal, so as to move freely, thereby causing the position of the first virtual character to change in the game scene. The first virtual character may also change the orientation in the game scene according to the user's touch operation.

In an optional implementation, a movement controller is provided on the graphical user interface, and the first virtual character is configured to move in the game scene according to the touch operation acting on the movement controller. The movement controller may be, for example, a virtual rocker, a direction control virtual key, or the like. And the present exemplary embodiment provides no specific limitations on movement controller.

Optionally, in response to the touch operation acting on the mobile controller, the virtual character is controlled to move in the game scene according to the movement of the touch point of the touch operation.

In an optional implementation, the movement controller is a virtual rocker, and controls the first virtual character to move in the game scene according to the touch operation acting on the virtual rocker.

In an optional implementation, the movement controller is a virtual cross key/virtual direction key (D-PAD), and the first virtual character is controlled to move in the game scene according to the touch operation acting on the virtual cross key.

In an optional implementation, an orientation control area is provided on the graphical user interface, and the first virtual character is configured to adjust an orientation in the game scene according to a touch operation acting on the orientation control area.

Optionally, in response to the touch operation acting on the orientation control area, and the orientation of the virtual character in the game scene is adjusted according to the movement of the touch point of the touch operation.

In an optional implementation, the orientation control area may be a different way such as a virtual rocker area, a direction control virtual key, etc.

In an optional implementation, the orientation control area is a virtual rocker area, and the virtual character is controlled to adjust the orientation in the game scene according to the touch operation acting on the virtual rocker area.

In an optional implementation, the orientation control area is a virtual cross key area/virtual direction key (D-PAD) area, and the virtual character is controlled to adjust the orientation in the game scene according to the touch operation acting on the virtual cross key area.

An expression of adjusting the orientation of the first virtual character in the game scene refers to that a current orientation of the first virtual character in the game scene is changed. It should be noted that the orientation and the movement direction of the first virtual character in the game scene are different concepts, and the orientation and the movement direction of the first virtual character in the game scene are independent of each other and may be overlaid with each other. For example, the orientation of the first virtual character A in the game scene is controlled to be north, and meanwhile, the first control virtual character A moves with a preset speed V1 as a moving speed and western as the moving direction, so that a performance effect of the first virtual character A in the game scene is that the first virtual character A takes the north direction as the current orientation, and at the same time changes the position in the game scene by taking the preset speed V1 as the moving speed and taking the western direction as the moving direction.

Through providing the orientation control area on the graphical user interface, in response to the touch operation acting on the orientation control area, the orientation of the virtual character in the game scene is adjusted according to a movement of a touch point of the touch operation.

Through the above embodiments, by controlling the current position and the current orientation of the first virtual character in the game scene, the position of the first building area is adjusted, and without increasing the number of controls on the graphical user interface, the user can quickly select and correct the area to be built within the game, thereby improving the smooth operation feeling of the game.

In an alternative embodiment, the space of the game scene is divided into multiple interconnected virtual geometries. Each virtual geometry may be a cuboid, a cube, a parallelepiped, a honeycomb body, or the like. It may be understood that different geometries may be spliced with each other to form the space of the whole game scene. It should be noted that each virtual geometry into which the space of the game scene is divided is a logical block area, such as a spatial area with x, y, z coordinates are all in a range of 0-50.

Optionally, each virtual geometry is a cuboid with the same length, width and height. A coordinate system XYZ including a horizontal direction XZ coordinate and a vertical upward coordinate Y is established in the space of the game scene. The space division manner divides the space into infinite cuboids with horizontal X=5 meters, Z=5 meters, and vertical upward direction Y=3.5 meters, and it should be noted that the length and width of the cuboid can be arbitrarily set by the developer according to actual situations.

Through the above embodiments, on the one hand, the building built by the first virtual character and the original build in the game scene can be aligned and spliced; on the other hand, a physical collision detection between the buildings during building in the game scene is avoided, thereby effectively reducing a system overhead and improving a smoothness of game play.

Hereinafter, multiple mutually spliced cuboids with the same length and width are used as an example for description, and it should be noted that multiple interconnected virtual geometries with any shape into which the space is divided are contained in the scope of protection of the present disclosure.

In an optional implementation, at step S1204, the step of determining the first building area according to the current position and the current orientation of the first virtual character in the game scene, and executing the build instruction in the first building area further includes the following steps.

At step S12041, a first virtual geometry where the virtual character is located is determined according to the current position of the first virtual character.

At step S12042, a surface of the first virtual geometry or a second virtual geometry adjacent to the first virtual geometry, or a section in the first virtual geometry or the second virtual geometry is determined as the first building area according to the current orientation of the first virtual character.

At step S12043, a build instruction is executed in the first building area of the game scene.

It should be noted that, in a game scene space divided into multiple interconnected virtual geometries with the same length and width, a surface and an inner section of each virtual geometry may be alternatively set as an area to be built. And meanwhile, original building components in the game scene are also pre-built according to the surface and the inner section of each virtual geometry.

Optionally, since the space of the game scene is divided into multiple interconnected virtual geometries with the same length and width, the virtual geometry where the first virtual character is located may be determined according to the current position of the first virtual character, and this virtual geometry is determined as the first virtual geometry.

Multiple second geometries adjacent to the first virtual geometry are determined centered on the first virtual geometry. And an expression of the second virtual geometry adjacent to the first virtual geometry refers to that the first virtual geometry and the second virtual geometry have a common surface, or the first virtual geometry and the second virtual geometry have a common edge.

One of surfaces or one of internal sections is selected in the first virtual geometry or the second virtual geometry as the first building area according to the current orientation of the first virtual character. In an alternative embodiment, one surface or one internal section of the first virtual geometry or the second virtual geometry occurring in front of the current orientation of the first virtual character is taken as the first building area. In an optional embodiment, one surface or one inner section of the first virtual geometry or the second virtual geometry is determined as the first building area according to a type of building model. For example, when the building model is a vertical wall, one vertical surface of the first virtual geometry or the second virtual geometry is taken as the first building area. When the building model is a ladder in an oblique direction, one inclined section of the first virtual geometry or the second virtual geometry is taken as the first building area.

Through the above embodiments, the game scene is normalized, so that the newly-built building and the original building in the game scene can be aligned and spliced to enhance an aesthetic feeling of a game screen. Meanwhile, physical collision detection between the buildings during building in the game scene is avoided, so that a system overhead can be effectively reduced and a smoothness of game play can be improved.

In an optional implementation, at step S12042, the step of determining a surface of the first virtual geometry or a second virtual geometry adjacent to the first virtual geometry or a section in the first virtual geometry or the second virtual geometry as the first building area according to the current orientation of the first virtual character further includes the following steps.

At step S12042_1, whether a distance between the virtual character and a surface corresponding to the current orientation in the first virtual geometry exceeds a first threshold is determined.

At step S12042_2, in responding to the distance being greater than or equal to the first threshold, one surface of the first virtual geometry or one section within the first virtual geometry is determined as the first building area.

At step S12042_3, in responding to the distance being less than the first threshold, one surface of the second virtual geometry or one section within the second virtual geometry is determined as the first building area.

In an optional implementation, the first threshold may be set by the game developer on his own initiative according to the actual situation.

Through the above-described embodiments, an appropriate build position of the building is selected according to the distance, so as to avoid waste of material and collision between the buildings.

Figure 5:
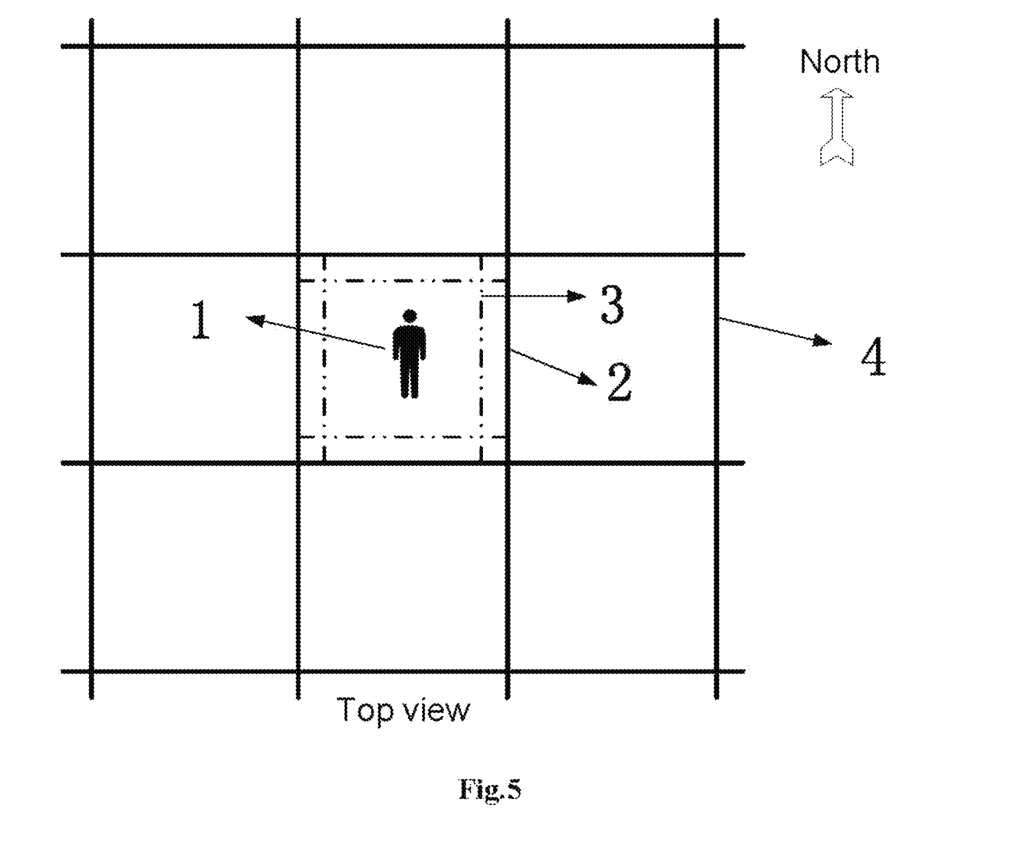
FIG. 5 is a schematic diagram of building in a game scene in an exemplary embodiment of the present disclosure.

In an alternative embodiment, FIG. 5 is a schematic diagram of building in a game scene in an exemplary embodiment of the present disclosure. As shown in FIG. 5, the game scene is divided into multiple cuboids with the same length and width, and FIG. 5 shows a top view of the game scene. In the game scene, the cuboid 2 where a game character 1 is located is determined as the first virtual geometry according to the current position of the game character 1 (namely the first virtual character). A surface of an eastern direction of the cuboid 2 corresponding to the current orientation of the game character 1 (the current orientation is eastern) is determined, according to the current orientation, as a target surface. It is determined whether a distance between the game character 1 and the target surface is greater than or equal to the first threshold. As shown in the figure, an area formed by a dashed line 3 and a boundary line of the cuboid 2 is a threshold identification area. When the game character 1 is outside the threshold identification area, that is, the distance between the game character 1 and the target surface is greater than or equal to a first threshold, at this time, one surface of the cuboid 2 or one section within the cuboid 2 is determined as a first building area. When the distance between the game character 1 and the target surface is smaller than the first threshold, the cuboid 4 adjacent to the cuboid 2 (namely common target surface) is determined as the second virtual geometry according to the target surface, and one surface of the cuboid 4 or one section within the cuboid 4 is determined as the first building area.

Moreover, a surface or an internal section adapted to the type of the building model is automatically selected as the first building area. For example, when the building model is a vertical wall model and the game character 1 is outside the threshold identification area, that is, the distance between the game character 1 and the target surface is greater than or equal to the first threshold, at this time, the vertical surface in the eastward direction of the cuboid 2 is determined as a first building area according to the current orientation of the game character 1, and a vertical wall is built in the first building area. When the distance between the game character 1 and the target surface is smaller than the first threshold, the vertical surface in the eastward direction of the cuboid 4 adjacent to the cuboid 2 is determined as the first building area according to the current orientation of the game character 1, and a vertical wall is built in the first building area.

For another example, when the building model is a horizontal plate model and the game character 1 is outside the threshold identification area, that is, the distance between the game character 1 and the target surface is greater than or equal to the first threshold, at this time, it is determined that a bottom surface or a top surface of the cuboid 2 is the first building area according to the current orientation of the game character 1, and a horizontal plate is built in the first building area. When the distance between the game character 1 and the target surface is smaller than the first threshold, the bottom surface or the top surface of the cuboid 4 adjacent to the cuboid 2 is determined as the first building area according to the current orientation of the game character 1, and a horizontal panel is built in the first building area.

For another example, when the building model is an obliquely upward ladder model and the game character 1 is outside the threshold identification area, that is, the distance between the game character 1 and the target surface is greater than or equal to the first threshold, then a diagonal section in the cuboid 2 is determined as the first building area according to the current orientation of the game character 1. And the obliquely upward ladder is built in the first building area. When the distance between the game character 1 and the target surface is smaller than the first threshold, the diagonal section in the cuboid 4 adjacent to the cuboid 2 is determined as the first building area according to the current orientation of the game character 1, and an oblique upward ladder is built in the first building area.

Through the above embodiments, the game scene is normalized, so that the newly-built building and the original build in the game scene can be aligned and spliced to enhance an aesthetic feeling of a game screen. Meanwhile, physical collision detection between the buildings during building in the game scene is avoided, so that a system overhead can be effectively reduced, and a smoothness of game operations can be improved. Moreover, the build position of the appropriate building is selected according to the distance to avoid waste of collision and material between the buildings.

Figure 6:
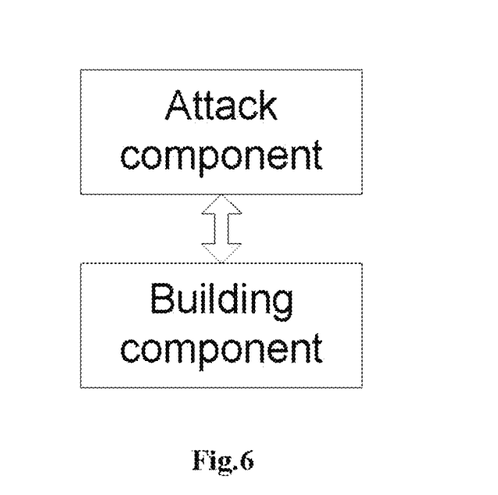
FIG. 6 is a structural schematic diagram of an information processing apparatus according to an embodiment of the present disclosure.

An information processing apparatus is further provided in the present exemplary embodiment. FIG. 6 is a composition diagram of an information processing apparatus according to an embodiment of the present disclosure. As shown in FIG. 6, the apparatus includes:

an attack component configured to provide an attack control on a graphical user interface, and in response to a first touch operation acting on the attack control, controlling a first virtual character to execute an attack instruction in a game scene;

a building component configured to provide a sub-control of a build control on the graphical user interface, in response to a second touch operation acting on the sub-control of the build control, providing the build control on the graphical user interface, and controlling the first virtual character to execute a build instruction in a first building area of the game scene.

According to one embodiment of the present disclosure, a new interactive mode for implementing a combination of multiple game play types on a mobile terminal is proposed, and on the one hand, the burden of the number of controls of a graphical user interface is not increased, and on the other hand, quick building can be implemented in an attack mode, the smoothness of manipulations is increased, and the game experience is greatly improved.

The specific details of the component elements in the foregoing embodiments have been described in detail in the corresponding information processing method. In addition, it can be understood that the information processing apparatus further includes other elements or components corresponding to the information processing method, which are not described herein again.

It should be noted that although several components or elements of a device for motion execution are mentioned in the above detailed description, such division is not mandatory. Indeed, according to embodiments of the present disclosure, the features and functions of the two or more components or elements described above may be embodied in one component or element. Instead, the features and functions of components or elements described above may be further divided into embodied by multiple components or elements.

Figure 7:
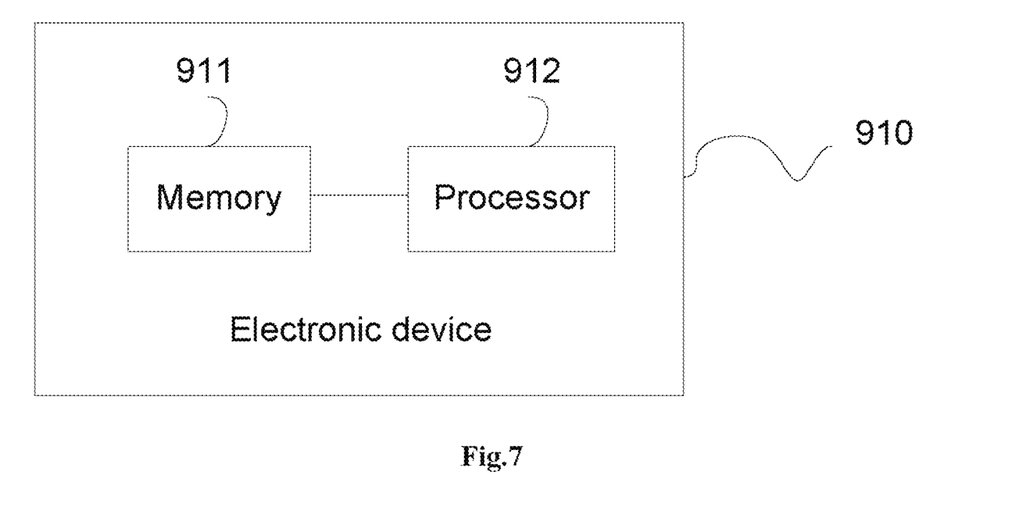
FIG. 7 is a structural schematic diagram of an electronic device according to an embodiment of the present disclosure.

FIG. 7 is a structural schematic diagram of an electronic device according to an embodiment of the present disclosure. As shown in FIG. 7, an electronic device 910 in this embodiment includes: a memory 911 and a processor 912. The memory 911 may be connected with the processor 912 through a bus. The electronic device has the processor for executing a software application and a touch screen which is rendered with the graphical user interface. The electronic device includes the following components:

a processor 912; and a memory 911 configured to store executable instructions of the processor;

and the processor is configured to execute the information processing method by executing the following executable instructions:

providing an attack control on a graphical user interface, and in response to a first touch operation acting on the attack control, controlling a first virtual character to execute an attack instruction in a game scene;

providing a sub-control of a build control on the graphical user interface, in response to a second touch operation acting on the sub-control of the build control, providing the build control on the graphical user interface, and controlling the first virtual character to execute a build instruction in a first building area of the game scene.

Optionally, providing the build control on the graphical user interface includes:

replacing the attack control with the build control on the graphical user interface.

Optionally, after controlling the first virtual character to execute the build instruction in the first building area of the game scene, the method further includes:

restoring the build control to the attack control on the graphical user interface, and providing the sub-control of the build control.

Optionally, controlling the first virtual character to execute the build instruction in the first building area of the game scene includes:

placing a building model to be built in the first building area of the game scene; and in response to a building confirmation triggering event, controlling the first virtual character to build a building corresponding to the building model to be built in the first building area.

Optionally, the build control includes at least two building model selection controls; the sub-control of the build control is a building model selection control of the at least two building model selection controls.

Optionally, the placing the building model to be built in the first building area of the game scene includes:

determining a building model corresponding to the sub-control of the build control as the building model to be built; and placing the building model to be built in the first building area of the game scene.

Optionally, providing the build control on the graphical user interface includes: providing all building model selection controls contained in the build control on the graphical user interface;

after determining the building model corresponding to the sub-control of the build control as the building model to be built, the method further includes:

modifying the building model to be built in response to a third touch operation acting on one of building model selection controls contained in the build control other than the sub-control of the build control.

Optionally, the build control further includes: a confirmation build control, and in response to a building confirmation triggering event, controlling the first virtual character to build the building corresponding to the building model to be built in the first building area including:

in response to a confirmation operation acting on the confirmation build control, controlling the first virtual character to build the building corresponding to the building model to be built in the first building area.

Optionally, controlling the first virtual character to execute the build instruction in the first building area of the game scene includes:

determining the first building area according to a current position and a current orientation of the first virtual character in the game scene, and executing the build instruction in the first building area.

Optionally, a space of the game scene is divided into a plurality of interconnected virtual geometries, determining the first building area according to the current position and the current orientation of the first virtual character in the game scene, and executing the build instructions in the first building area includes:

determining a first virtual geometry where the first virtual character is located according to the current position of the first virtual character;

determining a surface of the first virtual geometry or a second virtual geometry adjacent to the first virtual geometry or a section in the first virtual geometry or the second virtual geometry as the first building area according to the current orientation of the first virtual character; and executing the build instructions in the first building area of the game scene.

Optionally, determining a surface of the first virtual geometry or a second virtual geometry adjacent to the first virtual geometry or a section in the first virtual geometry or the second virtual geometry as the first building area according to the current orientation of the first virtual character includes:

determining whether a distance between the first virtual character and a surface of the first virtual geometry corresponding to the current orientation exceeds a first threshold;

in responding to the distance being greater than or equal to the first threshold, determining the surface of the first virtual geometry or the section in the first virtual geometry as the first building area; and in responding to the distance being less than the first threshold, determining that the surface of the second virtual geometry or the section in the second virtual geometry is the first building area.

Optionally, the first virtual geometry or the second virtual geometry is a cuboid with the same length, width and height.

According to at least some embodiments of the present disclosure, a new interactive mode for implementing a combination of multiple game play types on a mobile terminal is proposed, and on the one hand, a burden of the number of controls on the graphical user interface is not increased, and on the other hand, quick build can be implemented in an attack mode, the smoothness of manipulations is increased, and the game experience is greatly improved.

In an optional implementation, the electronic device may further include at least one processor, and memory resources represented by the memory, configured to store instructions executable by the processing component, such as an application. The application stored in the memory may include one or more components each corresponding to a set of instructions. Further, the processing component is configured to execute instructions to execute the information processing method described above.

The electronic device may further include: a power supply assembly configured to power management an electronic device; a wired or wireless network interface configured to connect an electronic device to a network; and an input output (I/O) interface. The electronic device may operate based on an operating system stored in memory, such as Android, iOS, Windows, MacOSX, Unix, Linux, FreeBSD, or the like.

Figure 8:
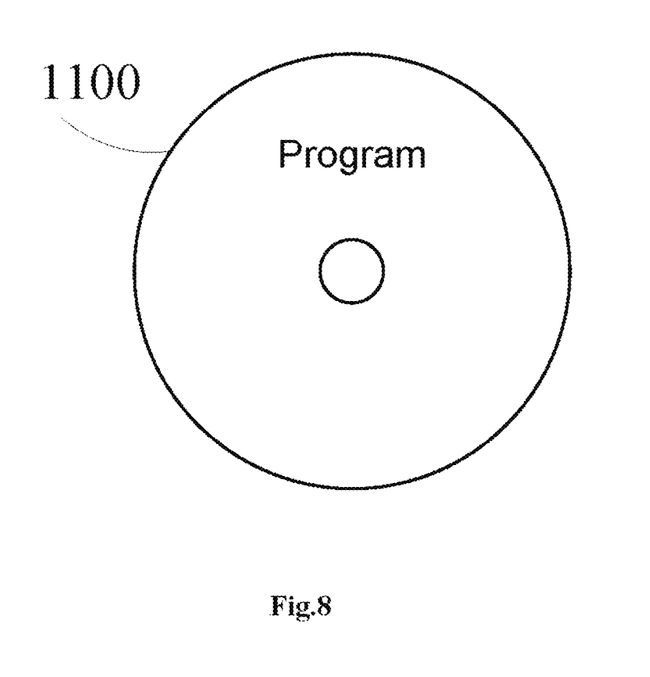
FIG. 8 is a structural schematic diagram of a storage medium according to an embodiment of the present disclosure.

FIG. 8 is a structural schematic diagram of a storage medium according to an embodiment of the present disclosure. As shown in FIG. 8, a program product 1100 according to an embodiment of the present disclosure is described, on which a computer program is stored, the computer program executing the following steps when executed by the processor:

providing an attack control on a graphical user interface, and in response to a first touch operation acting on the attack control, controlling a first virtual character to execute an attack instruction in a game scene;

providing a sub-control of a build control on the graphical user interface, in response to a second touch operation acting on the sub-control of the build control, providing the build control on the graphical user interface, and controlling the first virtual character to execute a build instruction in a first building area of the game scene.

Optionally, providing the build control on the graphical user interface includes:

replacing the attack control with the build control on the graphical user interface.

Optionally, after controlling the first virtual character to execute the build instruction in the first building area of the game scene, the method further includes:

restoring the build control to the attack control on the graphical user interface, and providing the sub-control of the build control.

Optionally, controlling the first virtual character to execute the build instruction in the first building area of the game scene includes:

placing a building model to be built in the first building area of the game scene; and in response to a building confirmation triggering event, controlling the first virtual character to build a building corresponding to the building model to be built in the first building area.

Optionally, the build control includes: at least two building model selection controls; the sub-control of the build control is a building model selection control of the at least two building model selection controls.

Optionally, the placing the building model to be built in the first building area of the game scene includes:

determining a building model corresponding to the sub-control of the build control as the building model to be built; and placing the building model to be built in the first building area of the game scene.

Optionally, providing the build control on the graphical user interface includes: providing all building model selection controls contained in the build control on the graphical user interface;

after determining the building model corresponding to the sub-control of the build control as the building model to be built, the method further includes:

modifying the building model to be built in response to a third touch operation acting on one of building model selection controls contained in the build control other than the sub-control of the build control.

Optionally, the build control further includes: a confirmation build control, and in response to a building confirmation triggering event, controlling the first virtual character to build the building corresponding to the building model to be built in the first building area including:

in response to a confirmation operation acting on the confirmation build control, controlling the first virtual character to build the building corresponding to the building model to be built in the first building area.

Optionally, controlling the first virtual character to execute the build instruction in the first building area of the game scene includes:

determining the first building area according to a current position and a current orientation of the first virtual character in the game scene, and executing the build instruction in the first building area.

Optionally, a space of the game scene is divided into a plurality of interconnected virtual geometries, determining the first building area according to the current position and the current orientation of the first virtual character in the game scene, and executing the build instructions in the first building area includes:

determining a first virtual geometry where the first virtual character is located according to the current position of the first virtual character;

determining a surface of the first virtual geometry or a second virtual geometry adjacent to the first virtual geometry or a section in the first virtual geometry or the second virtual geometry as the first building area according to the current orientation of the first virtual character; and executing the build instructions in the first building area of the game scene.

Optionally, determining a surface of the first virtual geometry or a second virtual geometry adjacent to the first virtual geometry or a section in the first virtual geometry or the second virtual geometry as the first building area according to the current orientation of the first virtual character includes:

determining whether a distance between the first virtual character and a surface of the first virtual geometry corresponding to the current orientation exceeds a first threshold;

in responding to the distance being greater than or equal to the first threshold, determining the surface of the first virtual geometry or the section in the first virtual geometry as the first building area; and in responding to the distance being less than the first threshold, determining that the surface of the second virtual geometry or the section in the second virtual geometry is the first building area.

Optionally, the first virtual geometry or the second virtual geometry is a cuboid with the same length, width and height.

According to at least some embodiments of the present disclosure, a new interactive mode for implementing a combination of multiple game play types on a mobile terminal is proposed, and on the one hand, a burden of the number of controls on the graphical user interface is not increased, and on the other hand, quick build can be implemented in an attack mode, the smoothness of manipulations is increased, and the game experience is greatly improved.

The computer-readable storage medium may include data signals propagating in a baseband or as part of a carrier wave, with readable program code carried therein. Such propagated data signals may take a variety of forms, including but not limited to electromagnetic signals, optical signals, or any suitable combination of the foregoing. The computer readable storage medium may send, propagate, or transmit a program for use by or in connection with an instruction execution system, apparatus, or device.

The program code contained in the computer readable storage medium may be transmitted with any suitable medium, including but not limited to wireless, wired, optical cable, radio frequency, etc., or any suitable combination of the foregoing.

Through the description of the above embodiments, those skilled in the art will readily understand that the example implementations described herein may be implemented by software or by software in combination with necessary hardware. Therefore, the technical solutions according to the embodiments of the present disclosure may be embodied in the form of a software product, and the software product may be stored in a non-volatile storage medium (which may be a CD-ROM, a U-disk, a mobile hard disk, etc.) or on a network. Several instructions are contained to cause a computing device (which may be a personal computer, a server, an electronic device, or a network device, etc.) to perform a method according to an embodiment of the present disclosure.

Other embodiments of the present disclosure will readily occur to those skilled in the art upon consideration of the specification and practice of the disclosure disclosed herein. The present disclosure is intended to cover any variation, use or adaptive variation of the present disclosure that follows the general principles of the present disclosure and includes common general knowledge or customary technical means in the art not disclosed in the present disclosure. The specification and embodiments are to be regarded as exemplary, with the true scope and spirit of the disclosure being indicated by the claims.

It should be understood that the present disclosure is not limited to the precise structures already described above and shown in the drawings, and various modifications and changes may be made without departing from the scope thereof. The scope of the present disclosure is limited only by the appended claims.

INDUSTRIAL APPLICABILITY

Through a new interactive mode for implementing a combination of multiple game play types on a mobile terminal proposed in at least some embodiments of the present disclosure, on the one hand, a burden of the number of controls on the graphical user interface is not increased, and on the other hand, quick build can be implemented in an attack mode, the smoothness of manipulations is increased, and the game experience is greatly improved.

What is claimed is:

1. An information processing method, comprising:
   providing an attack control on a graphical user interface, and in response to a first touch operation acting on the attack control, controlling a first virtual character to execute an attack instruction in a game scene, wherein the first virtual character is a game virtual character that is manipulated by a mobile terminal;
   providing a sub-control of a build control on the graphical user interface, in response to a second touch operation acting on the sub-control of the build control, providing the build control on the graphical user interface, and controlling the first virtual character to execute a build instruction in a first building area of the game scene, wherein the build control comprises at least two building model selection controls, and the sub-control of the build control is a building model selection control of the at least two building model selection controls.

2. The information processing method as claimed in claim 1, wherein providing the build control on the graphical user interface comprises:
   replacing the attack control with the build control on the graphical user interface.

3. The information processing method as claimed in claim 2, wherein after controlling the first virtual character to execute the build instruction in the first building area of the game scene, the method further comprises:
   restoring the build control to the attack control on the graphical user interface, and providing the sub-control of the build control.

4. The information processing method as claimed in claim 1, wherein controlling the first virtual character to execute the build instruction in the first building area of the game scene comprises:
   placing a building model to be built in the first building area of the game scene; and
   in response to a build confirmation trigger event, controlling the first virtual character to build a building corresponding to the building model to be built in the first building area.

5. The information processing method as claimed in claim 1, wherein placing the building model to be built in the first building area of the game scene comprises:
   determining a building model corresponding to the sub-control of the build control as the building model to be built; and
   placing the building model to be built in the first building area of the game scene.

6. The information processing method as claimed in claim 5, wherein
   providing the build control on the graphical user interface comprises: providing all building model selection controls contained in the build control on the graphical user interface;
   after determining the building model corresponding to the sub-control of the build control as the building model to be built, the method further comprises:
   modifying the building model to be built in response to a third touch operation acting on one of building model selection controls contained in the build control other than the sub-control of the build control.

7. The information processing method as claimed in claim 5, wherein the build control further comprises: a confirmation build control, and in response to a building confirmation triggering event, controlling the first virtual character to build the building corresponding to the building model to be built in the first building area comprising:

in response to a confirmation operation acting on the confirmation build control, controlling the first virtual character to build the building corresponding to the building model to be built in the first building area.

8. The information processing method as claimed in claim 1, wherein controlling the first virtual character to execute the build instruction in the first building area of the game scene comprises:

determining the first building area according to a current position and a current orientation of the first virtual character in the game scene, and executing the build instruction in the first building area.

9. The information processing method as claimed in claim 8, wherein a space of the game scene is divided into a plurality of interconnected virtual geometries, determining the first building area according to the current position and the current orientation of the first virtual character in the game scene, and executing the build instructions in the first building area comprises:

determining a first virtual geometry where the first virtual character is located according to the current position of the first virtual character;

determining a surface of the first virtual geometry or a second virtual geometry adjacent to the first virtual geometry, or a section in the first virtual geometry or the second virtual geometry as the first building area according to the current orientation of the first virtual character; and executing the build instructions in the first building area of the game scene.

10. The information processing method as claimed in claim 9, wherein determining a surface of the first virtual geometry or a second virtual geometry adjacent to the first virtual geometry, or a section in the first virtual geometry or the second virtual geometry as the first building area according to the current orientation of the first virtual character comprises:

determining whether a distance between the first virtual character and a surface of the first virtual geometry corresponding to the current orientation exceeds a first threshold;

in responding to the distance being greater than or equal to the first threshold, determining the surface of the first virtual geometry or the section in the first virtual geometry as the first building area; and in responding to the distance being less than the first threshold, determining that the surface of the second virtual geometry or the section in the second virtual geometry is the first building area.

11. The information processing method as claimed in claim 9, wherein the first virtual geometry or the second virtual geometry is a cuboid with the same length, width and height.

12. The information processing method as claimed in claim 1, wherein the sub-control of the build control is one of components of the build control, or the sub-control of the build control is an independent control.

13. The information processing method as claimed in claim 2, wherein an operation of replacing the attack control with the build control is to make the attack control have a function of controlling the first virtual character to build the building, or an operation of replacing the attack control with the build control is to hide or cancel the attack control on the graphical user interface and provide the build control at a position of the attack control or near the location of the attack control.

14. The information processing method as claimed in claim 3, wherein the sub-control of the build control is provided on an original position of the sub-control of the build control of the graphical user interface, or the sub-control of the build control is reserved when the build control are restored to the attack control.

15. The information processing method as claimed in claim 1, wherein an operation of placing a building model to be built in the first building area refers to that the building model to be built is not built in the first building area, but the building model to be built is previewed to display in the first building area.

16. The information processing method as claimed in claim 9, wherein the first virtual geometry and the second virtual geometry have a common surface, or the first virtual geometry and the second virtual geometry have a common edge.

17. An electronic device, comprising:
a processor; and
a memory configured to store executable instructions of the processor;
wherein the processor is configured to execute the information processing method as claimed in claim 1 by executing the executable instructions.

18. A computer readable storage medium storing a computer program, the computer program being executed by a processor to implement the information processing method as claimed in claim 1.

19. An information processing apparatus, comprising:
an attack component configured to provide an attack control on a graphical user interface, and in response to a first touch operation acting on the attack control, controlling a first virtual character to execute an attack instruction in a game scene, wherein the first virtual character is a game virtual character that is manipulated by a mobile terminal;
a building component configured to provide a sub-control of a build control on the graphical user interface, in response to a second touch operation acting on the sub-control of the build control, providing the build control on the graphical user interface and controlling the first virtual character to execute a build instruction in a first building area of the game scene, wherein the build control comprises at least two building model selection controls, and the sub-control of the build control is a building model selection control of the at least two building model selection controls.

* * * * *